(12) United States Patent
Ilday et al.

(10) Patent No.: US 7,436,862 B2
(45) Date of Patent: Oct. 14, 2008

(54) SELF-SIMILAR LASER OSCILLATOR

(75) Inventors: Fatih Omer Ilday, Ankara (TR); Frank Wise, Ithaca, NY (US)

(73) Assignee: Cornell Research Foundation, Inc., Ithaca, NY (US)

(*) Notice: Subject to any disclaimer, the term of this patent is extended or adjusted under 35 U.S.C. 154(b) by 0 days.

(21) Appl. No.: 11/510,739

(22) Filed: Aug. 28, 2006

(65) Prior Publication Data
US 2006/0291521 A1 Dec. 28, 2006

Related U.S. Application Data

(63) Continuation of application No. 10/769,523, filed on Jan. 30, 2004, now abandoned.

(51) Int. Cl.
*H01S 3/30* (2006.01)

(52) U.S. Cl. ............................. 372/6; 372/94

(58) Field of Classification Search .................. 372/6, 372/94
See application file for complete search history.

(56) References Cited

U.S. PATENT DOCUMENTS 7,251,258 B2 * 7/2007 Wise et al. .................... 372/6

* cited by examiner

*Primary Examiner*—Dung T Nguyen
(74) *Attorney, Agent, or Firm*—Jones, Tullar & Cooper, P.C.

(57) ABSTRACT

A laser producing high energy ultrashort laser pulses comprises a normal dispersion segment, a gain segment, an anomalous dispersion segment with negligible nonlinearity and an effective saturable absorber arranged to form a laser cavity. Each segment is optically interconnected so that a laser pulse will propagate self-similarly therein. (A pulse that propagates in a self-similar manner is sometimes referred to as a "similariton.") With this laser the limitations of prior art laser oscillators are avoided. Also provided are means for pumping the gain medium in the laser cavity, and means for extracting laser pulses from the laser cavity. The laser cavity is preferably a ring cavity. Preferably the laser is configured to achieve unidirectional circulation of laser pulses therein. This configuration is scalable to much higher pulse energy than lasers based on soliton-like pulse shaping.

14 Claims, 10 Drawing Sheets

Schematic Illustration of a preferred embodiment of the invention.

Figure 1A. The evolution of the pulse as it circulates one round trip in the cavity is illustrated by the above plot of frequency chirp versus cavity position. Not to scale.

Figure 1B. Example of stable pulse formation found in numerical simulations. Top: temporal profile (left) and power spectrum (right) of the pulse at the output port. Middle: pulse intensity profile versus position in the cavity. Bottom: contour plot of the pulse propagation that shows the self-similar evolution.

Figure 1C. Graph illustrating how for increasing total normal dispersion the pulse energy diverges dramatically from that of a stretched-pulse laser.

Figure 2. Schematic Illustration of a preferred embodiment of the invention.

Figure 3 is a schematic diagram illustrating how the pulse propagates self-similarly within the laser cavity.

FIG-4 shows the characteristic near parabolic shape of the spectrum that is typical of self-similar operation of a laser oscillator.

FIG. 5 shows the pulse from the preferred embodiment before dechirping (red curve) and after dechirping (yellow curve) using a pair of gratings.

FIG. 6 shows the spectral shape of a higher pulse energy self-similar (similariton) laser.

FIG. 7 shows the autocorrelation trace of the dechirped pulse from a high pulse energy self-similar laser oscillator.

FIG. 8 schematically illustrates the main features an all-fiber version of the subject invention.

SELF-SIMILAR LASER OSCILLATOR

CROSS-REFERENCE TO RELATED APPLICATIONS

This application is a Continuation under 35 U.S.C. 120 of U.S. application Ser. No. 10/769,523 which was filed on Jan. 30, 2004 now abandoned.

GOVERNMENT SPONSORSHIP STATEMENT

This invention was made with government support under National Institutes of Health Grant No. EB002019 and National Science Foundation Contract No. ECS 0217958. The government has certain rights in this invention.

BACKGROUND OF THE INVENTION

1. Field of the Invention

This invention relates to lasers, and more particularly to fiber lasers.

2. Description of Related Art

Lasers, particularly those partially or wholly incorporating optical fibers, have emerged as attractive sources of extremely short pulses of light. Fibers lasers are of particular interest because they can be tightly coiled to produce long path lengths in compact geometries. And because fiber lasers can be hard-wired, they can be made impervious to adverse environmental effects—especially when the polarization is fixed in a manner that makes them relatively insensitive to mechanically and/or thermally induced birefringence effects. They can also be a relatively inexpensive, cost-effective solution to the generation of short pulses of light. Rare earth-doped fibers, and in particular neodymium-doped or ytterbium-doped fibers, are particularly advantageous for fiber laser designs because they can be diode pumped and are scalable to high powers. Mode-locked fiber lasers incorporating rare earth-doped fibers have been shown for in several configurations including linear, ring, and figure-eight geometries.

The energy of the pulses generated in fiber laser oscillators is generally limited by effects that cause the pulse to break up into several pulses (called wave-breaking.) Wave-breaking is a consequence of excessive nonlinearity within the oscillator cavity—a limitation that is particularly problematic in ultrashort pulse fiber lasers where the small beam diameter produces high intensities and therefore large nonlinear phase shifts. Prior art work, while descriptive of these propagation effects in fiber amplifiers did not anticipate this regime of operation in a laser oscillator.

BRIEF SUMMARY OF THE INVENTION

The operating regime described in this invention, which corresponds to an asymptotic solution of the governing wave equation, would appear to be incompatible with the periodic boundary condition required for stable operation of a laser oscillator. This is novel, and has not been anticipated in prior art laser oscillators.

This invention comprises a laser oscillator that tolerates strong nonlinearity without wave-breaking. This text teaches both the numerical predictions and experimental evidence of the existence of a stable pulse that propagates "self-similarly" within a laser oscillator cavity (a similariton pulse.) By propagating self-similarly we mean that, while the amplitude and phase of the pulse may vary as it propagates around the cavity, the shape of the pulse does not. This regime of operation constitutes a new type of pulse shaping in a modelocked laser, qualitatively distinct from the well-known soliton (see Kafka and Baer, Optics Letters 14, 1269 (1989) and U.S. Pat. No. 4,835,778 both incorporated herein by reference) and stretched-pulse laser (see for example U.S. Pat. No. 5,617,434 incorporated herein by reference in its entirety) regimes (stretched-pulse lasers are referred to herein as dispersion-managed (DM) soliton lasers.)

More particularly, those familiar with the art will recognize that pulse formation in lasers that produce pulses of short duration is dominated by the interplay between dispersion and nonlinearity, in the form of soliton dynamics. These pulses are not exact solitons, because the laser cavity constitutes a dissipative system. Hence, their basic features can be understood within the formalism of a complex Ginzburg-Landau equation. Soliton-like dynamics are particularly strong in fiber lasers; the cavity length typically corresponds to several times the dispersion length, which is the propagation distance over which a pulse would broaden by approximately a factor of 1.4 owing to linear group-velocity dispersion. An effective saturable absorber (SA) is required for initiation of pulsed operation from intra-cavity noise and subsequent stabilization of the pulse.

Soliton fiber lasers are limited to low pulse energies (100 pJ or less). At higher energies, nonlinear effects cause wave-breaking which leads to a transition to multiple-pulsing (more than one pulse circulating within the cavity). The pulse can tolerate only a small nonlinear phase shift (substantially less than one radian) within one round-trip before instabilities occur. Stretched-pulse fiber lasers of the type described in U.S. Pat. No. 5,617,434 consist of segments of anomalous (soliton-supporting) and normal (non-soliton-supporting) GVD. These implement the concept of dispersion management (DM), and support the analog of DM solitons. DM solitons can tolerate nonlinear phase shifts an order of magnitude larger than ordinary solitons, and the pulse energy thus exceeds the soliton energy by the same factor.

Solitons are static solutions of a nonlinear wave equation, and DM solitons are breathing solutions, both of which satisfy the periodic boundary conditions with feedback required for stable oscillatory behavior. In contrast, pulses that propagate self-similarly are asymptotic solutions to the governing equation. The evolution of their properties (e.g., the pulse duration) is monotonic. Such a solution cannot satisfy periodic boundary conditions. An additional mechanism is required to obtain a stable operation in a cavity. Also pulses in a laser will, in general, evolve to fill available gain bandwidth. However, self-similar propagation of intense pulses is disrupted if the pulse encounters a limitation to its spectral bandwidth.

Figure 1A:
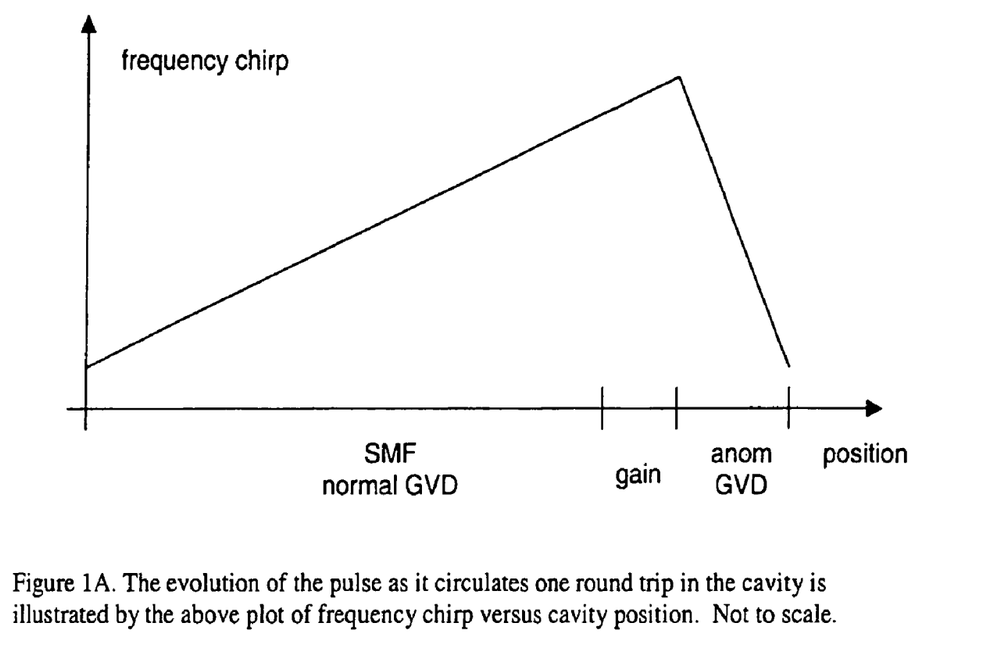
FIG. 1A is a graph showing the evolution of a pulse as it circulates one round trip in the laser cavity of the present invention and is illustrated by the plot of frequency chirp versus cavity position.

A model fiber laser cavity includes a segment of single-mode fiber (SMF) with normal dispersion that forms a large portion of the cavity length. The pulse propagating in the cavity has a central wavelength that lies within the gain profile of the gain medium. As the pulse propagates through the SMF fiber, its bandwidth is broadened through nonlinear interaction with the material. This effect operates in combination with group velocity dispersion (GVD) to create an approximately linear chirp on the pulse. Amplification is provided by a segment with gain sufficient to achieve the desired pulse energy. The length of this gain segment is minimized so that the pulse will experience negligible GVD and nonlinearity during amplification—effectively decoupling bandwidth filtering from nonlinear evolution in the fiber. The gain fiber is followed by an effective saturable absorber (SA), which may also serve as an output coupler. The final element is a dispersive delay line (DDL) that provides anomalous dispersion with negligible nonlinearity. Chirp accumulated in self-similar propagation will be compensated by the DDL, while any excess bandwidth will be filtered by the gain medium. This configuration produces a self-consistent solution in the resonator cavity and results in stable operation of the laser. The evolution of the pulse as it circulates one round trip in the cavity is illustrated by the plot of frequency chirp versus cavity position, shown in FIG. 1A.

Numerical simulations of the model laser were employed to search for self-similar solutions to the governing equations and to verify that such solutions are global attractors (that is, self-starting is accessible from intracavity noise.) The parameters of the numerical model correspond to the preferred embodiment. A 4 meter long segment of SMF is connected to a 20 centimeter long gain fiber, and a grating pair is used for the DDL. Propagation within each section is modeled with an extended nonlinear Schrodinger equation $$\frac{\partial A}{\partial \xi} + i\beta_2 \frac{\partial A}{\partial \tau^2} = i\gamma |A|^2 A + g(E_{pulse})A$$

where $A$ is the envelope of the field, $\xi$ is the propagation coordinate, $\tau$ is time scaled to the pulse duration, $\beta_2$ is the GVD, and $\gamma$ is the effective coefficient of cubic nonlinearity for the fiber section. $\gamma$ is set to zero in the DDL, which is adjusted to achieve a desired total dispersion of the cavity. The pulse energy is given by $$E_{pulse} = \int_{-T_R/2}^{T_R/2} |A|^2 d\tau$$

and $T_R$ is the cavity roundtrip time. $g(E_{pulse})$ is the net gain which is non-zero only for the amplifier fiber. The gain saturates with total energy according to $$g(E_{pulse}) = \frac{g_0}{1 + E_{pulse}/E_{sat}}$$

with $g_0$ the small signal gain with a parabolic frequency dependence, and a bandwidth of 40 nm is assumed. The effective gain saturation energy, $E_{sat}$, is determined by the pump power. The SA is assumed to saturate monotonically, and is modeled by a transfer function that describes its transmittance $$T = 1 - \frac{l_0}{1 + P(\tau)/P_{sat}}$$

where $l_0$ is the unsaturated loss, $P(\tau)$ is the instantaneous pulse power and $P_{sat}$ is the saturation power. The pulse amplitude is reduced by a factor of 10 after the SA to account for other linear losses in the experimental setup as described below.

Figure 1B:
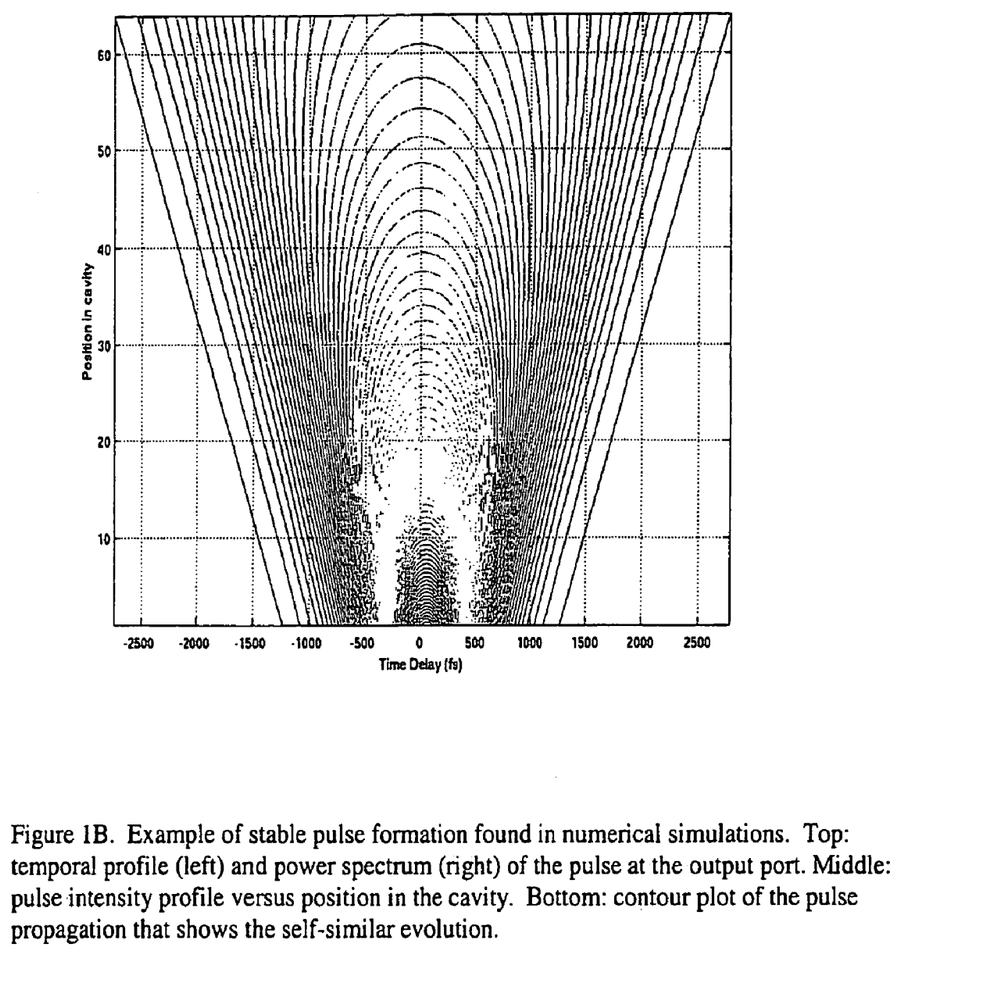
FIG. 1B is a graph showing several aspects of a typical solution of a stable pulse formation example over a reasonably-wide range of parameters.
Figure 1C:
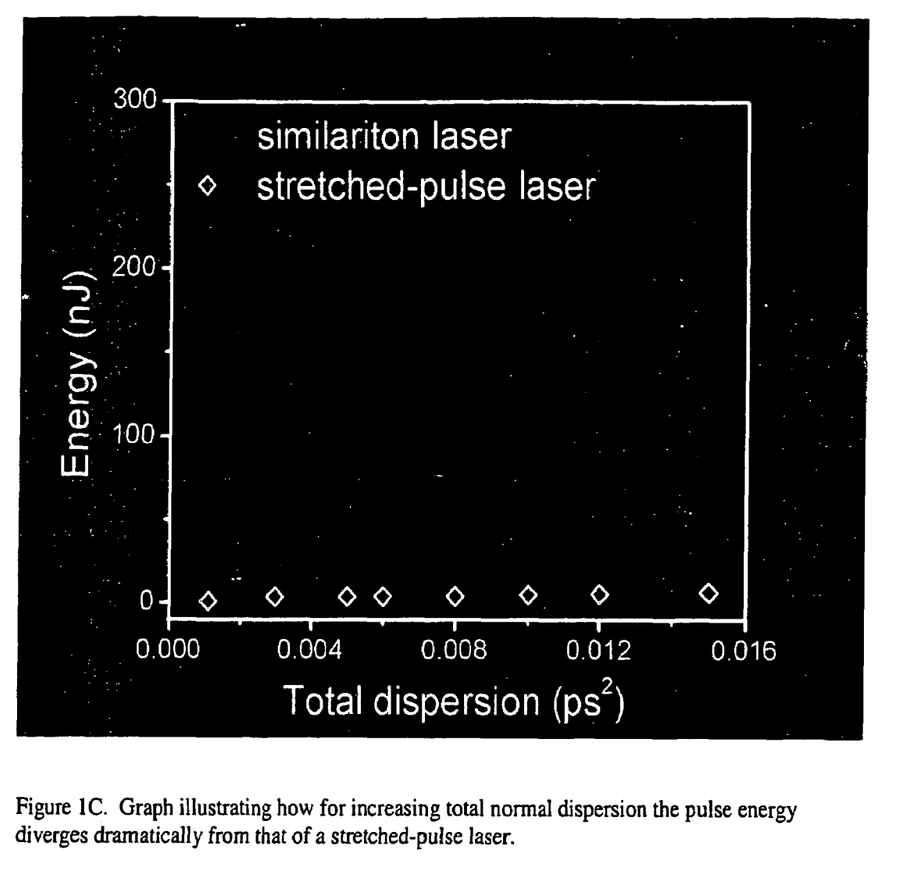
FIG. 1C is a graph illustrating how for increasing total normal dispersion, the pulse energy diverges dramatically.

The simulations exhibit stable pulse formation over a reasonably-wide range of parameters. Several aspects of a typical solution are shown in FIG. 1B. The approximately-parabolic temporal profile, nearly linear chirp, characteristic shape of the power spectrum, and the variation of the intensity profile are all signatures of self-similar pulse formation. For reference, the results are compared to a laser that supports DM solitons. Self-similar pulse propagation does not increase the maximum stable pulse energy when the net group velocity dispersion is anomalous. However, for increasing $\beta_{net}>0$ (normal dispersion) the pulse energy diverges dramatically (see FIG. 1C) from that expected for a DM soliton laser. The stretching ratio for the laser with self-similar evolution of the pulse decreases exponentially at fixed pulse energy as the net group velocity dispersion is increased. Thus, the energy-scaling can be understood intuitively as follows: the (exponential) increase in pulse energy with increasing GVD maintains a fixed stretching ratio.

The fiber laser of the invention overcomes the limitations of past fiber lasers to provide a laser operating in the self-similar regime. This regime is distinguished from the previously known soliton and stretched pulse regimes in that it is more tolerant of nonlinear effects induced on the pulse by propagation through the fibers with normal group velocity dispersion. Thus this self-similar laser operates outside of the soliton and stretched pulse fiber laser regime and is capable of producing much higher energy ultrashort laser pulses.

The invention thus provides, in one general aspect, a fiber laser having a long, undoped, net normal group velocity dispersion single mode fiber segment joined in series with a rare earth doped, net normal group velocity dispersion fiber segment which is in turn joined with an effective saturable absorber followed by a linear net anomalous group velocity dispersion segment. With this configuration, self-similar propagation of a laser pulse in the cavity is made possible in a manner that satisfies the periodic boundary conditions required for stable laser operation. The fiber laser also provides means for modelocking laser radiation in the laser cavity, means for pumping the gain medium in the laser cavity, and means for extracting laser pulses from the laser cavity.

In a preferred embodiment, the laser cavity exhibits a net positive group velocity dispersion.

In another preferred embodiment the gain in the laser cavity comprises a segment of rare-earth doped material, such as neodymium- or ytterbium- or erbium- or thulium-doped material and may also include more than one dopant (known as a co-dopant) for purposes such as facilitating energy transfer from a specific pump wavelength to the absorption wavelength of the gain material. The rare-earth doped material preferably possesses net positive group velocity dispersion.

In other embodiments, the laser cavity comprises a linear cavity geometry, a ring cavity geometry, or a figure eight geometry, as is known to those skilled in the art.

In yet another embodiment the cavity is configured to achieve unidirectional circulation of laser pulse in the cavity.

In yet another embodiment the laser pulses extracted from the ring cavity preferably exhibit a pulse energy of at least 1 nJ.

In another embodiment, the modelocking means provides passive modelocking of the laser radiation in the laser cavity via nonlinear polarization evolution (NPE). A nonlinear polarization rotator uses elliptically polarized laser pulses to provide intensity dependent loss and transmission of laser energy such that the substantially off-peak laser pulse intensity energy is rejected and substantially on-peak laser pulse intensity energy is passed to continue circulating in the laser cavity.

In another embodiment the nonlinear polarization rotator comprises all-fiber components, or bulk components partially or completely interconnected with fibers.

In another embodiment, the modelocking means is accomplished through the Kerr nonlinearity via the Kerr lens effect.

In yet another embodiment the modelocking means is accomplished through a semiconductor material.

In yet another embodiment the gain media is chosen from a list comprising, a bulk gain material, a semiconductor, and or gain fiber.

In other embodiments, one or more wavelength-division-multiplexed (WDM) input coupler(s) is used to couple the pump radiation into and out of the laser cavity.

In other embodiments a semiconductor diode light source, or array of semiconductor diode light sources, is used to pump the gain medium.

In another embodiment at least one diode-pumped solid state source is used to pump the gain medium within the laser cavity. In one embodiment the means for extracting a portion of the intracavity laser pulse is a WDM coupler.

In another embodiment the means of extracting a portion of the intracavity laser pulse is via the NPE rejection port.

In yet another embodiment both an NPE rejection port and a WDM output coupler are incorporated in the same laser cavity to provide two outputs from the laser.

In yet another embodiment the output from the laser is coupled into an amplifier either directly or through a fiber stretcher for subsequent amplification, as is known to those skilled in the art.

In another preferred embodiment the anomalous dispersion segment with negligible nonlinearity comprises one or more bulk optical elements chosen from a list comprising a prism or a grating.

In another preferred embodiment the anomalous dispersion segment with negligible nonlinearity comprises a hollow microstructure fiber.

In yet another embodiment one or more fiber segments are chosen from a list comprising bulk optical elements, single mode fibers, multi-mode fibers, microstructure fibers, photonic bandgap fibers, or large mode area fibers.

In one embodiment the laser pulse extracted from the laser cavity propagates through a segment of hollow microstructure fiber to compress the pulse.

In yet another embodiment, the extracted laser pulse propagates through a segment of hollow photonic bandgap fiber whose wall is doped with a gain element that is pumped to provide gain for the pulse propagating therein.

In another preferred embodiment an arrangement of gratings and/or prisms are employed to compress the pulses extracted from the laser.

The fiber laser of the invention achieves high-energy ultrashort laser pulses by intentionally operating outside of the dispersion-managed soliton regime, contrary to conventional theories suggesting that operation in dispersion-managed soliton is not only preferable but required by the periodic boundary conditions required for stable laser oscillation with feedback. The inventors herein have recognized that this new regime of operation eliminates the limitations imposed by the prior art designs such as the soliton and stretched-pulse fiber lasers. They also recognized that this laser oscillator is capable of producing pulse energies substantially larger than those achieved in previous designs. In addition the inventors anticipate that this laser will have extremely low noise—an operating characteristic that is very useful in applications where it is important to operate close to threshold to achieve the desired outcome, or where a high degree of reproducibility is important, as, for example, is the case in the technology described in U.S. Pat. No. RE 37,585 and divisionals thereof incorporated herein in their entirety by reference.

The fiber laser of the invention has a wide range of applications in the fields of research, instrumentation, biomedical engineering, spectroscopy, telecommunications, micromachining, ablation, microfabrication, multi-photon photopolymerization, multi-photon microscopy, and multiphoton imaging, multi-photon ionization, and x-ray generation, to name but a few of the possible multi-photon initiated applications for which this laser is suited. The fiber laser described herein could also be used as a seed source for amplifier systems that are both bulk optical element and/or employ fibers, and that are operated in one or more of a single pass, multi-pass, or chirped pulse amplifier schemes. The many advantages of this compact, inexpensive, robust source of pulses may thus be widely employed to advance technology and applications beyond their current level.

DETAILED DESCRIPTION OF THE INVENTION

Figure 2:
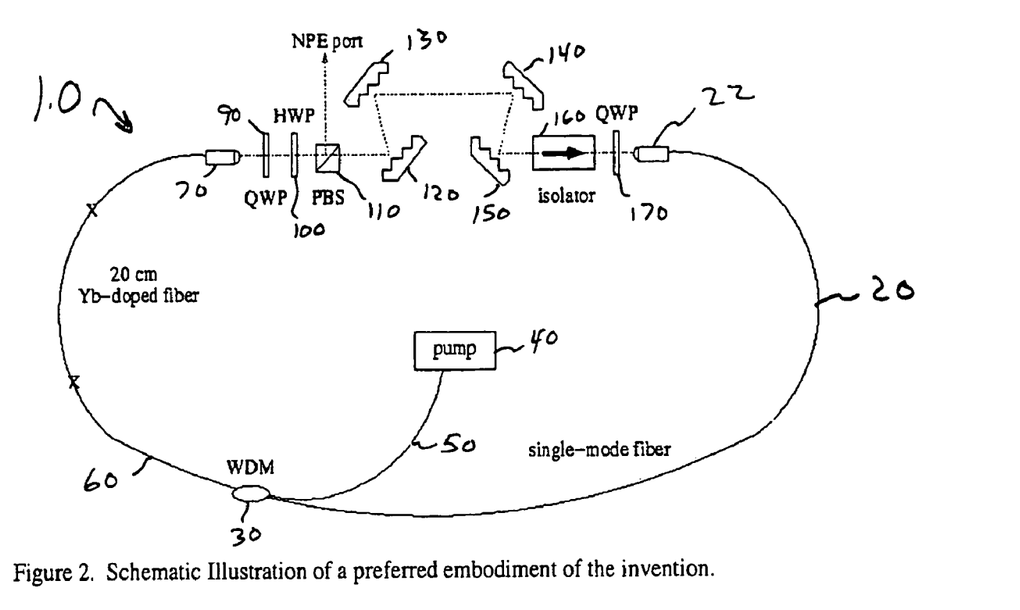
FIG. 2 is a schematic illustration of a preferred embodiment of the invention.

Referring now to FIG. 2, the fiber laser 10 of the invention is shown as a ring laser. The fiber laser of the invention could also be configured as a figure-eight cavity, linear cavity or other suitable laser geometry, as will be understood by those skilled in the art. The ring geometry described herein is but one example of the many geometries to which the invention could be applied.

The fiber ring laser of FIG. 2 comprises several segments. On the right side of the ring, we see segment 20 of the ring laser 10 of the invention comprises the majority of the optical length of the cavity and generally supports only a single spatial mode. In a preferred embodiment this segment of fiber single mode fiber (SMF) has a length of 4 meters. Segment 20 is characterized by a net positive group velocity dispersion (also referred to as net normal dispersion). One end of segment 20 is connected a collimator 22 to receive a pulse circulating in the cavity. The other end is connected to a wavelength division multiplexer (WDM) coupler 30 to couple the pump light from one or more laser diodes 40 into the cavity via fiber 50, as shown (a WDM coupler is but one of many means known to those skilled in the art whereby pump light may be coupled into a fiber. Other examples include a V-groove coupler, a star coupler. The means by which pump light is coupled to the gain medium is not critical to the invention and is not intended to be limiting in any way.

Connected to the other end of WDM coupler 30 is a second segment of fiber 60—also characterized by a net positive group velocity dispersion. Segment 60 is doped with a rare earth element. Segment 60 has a dopant concentration and length chosen to minimize nonlinear pulse propagation effects while maximizing gain therein. In a preferred embodiment, the length is chosen to be 23 cm and the fiber is doped with Ytterbium to a level of 23,600 ppm. The opposite end of fiber segment 60 is attached to a collimator 70 to collimate the light exiting the fiber. Optically connected to the collimator is a quarter wave plate 90, a half wave plate 100, and a polarization beam splitter 110. Taken together, these three elements form the "nonlinear polarization evolution" (NPE) section of the cavity.

Optically connected to the NPE section is a net anomalous dispersion section of the cavity. In the illustrative embodiment this section comprises four gratings, 120, 130, 140, and 150 aligned and spaced so that a chirped pulse entering this section from the left is compressed to a minimum value as it exits this section on the right. Preferably this anomalous dispersion section of the cavity possesses negligible nonlinearity in order to avoid soliton pulse shaping effects therein. This section is followed by an optical isolator 160, and a second quarter wave plate 170 which serve to favor unidirectional propagation of light within the cavity and facility self-starting. All the above elements are optically connected in series and aligned so that a pulse of light circulates in the cavity.

Figure 3:
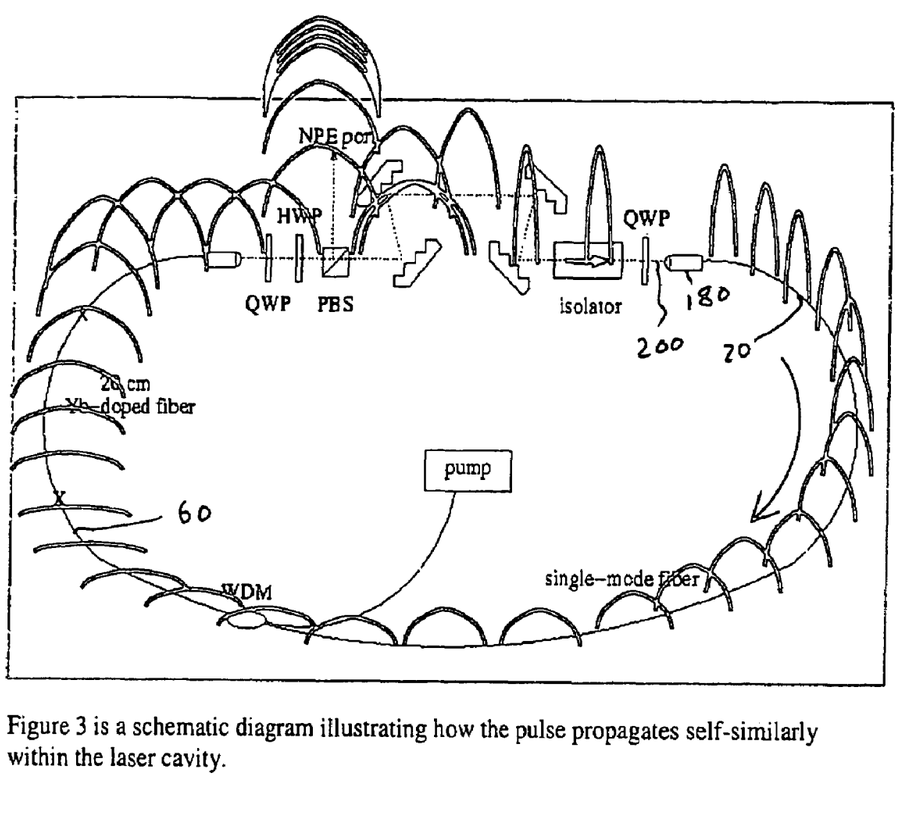
FIG. 3 is a schematic diagram illustrating how the pulse propagates self-similarly within the preferred embodiment of the laser cavity.

FIG. 3 schematically illustrates how a pulse propagates self-similarly (i.e. without substantial variation in the shape) in this ring cavity configuration. Starting at point 200 just after the quarter wave plate 170, the pulse enters into through fiber segment 20 its bandwidth increases through nonlinear interaction with the material of the fiber and it acquires a positive frequency chirp from group velocity dispersion (GVD) in the material. The combined effect of positive nonlinearity and normal GVD serves to linearize the chirp of the pulse. The shape of the pulse remains, however, substantially unchanged (by substantially unchanged here we mean that the best fit to the pulse shape remains unchanged as it propagates through the fiber—in this case the best fit is a parabolic shape.) The pulse is then amplified in the gain section 60, still retaining its substantially parabolic pulse shape. The gain segment is kept short in order to decouple amplification of the pulse from nonlinear pulse shaping effects in this section of the cavity (pulse shaping is a hybrid of self-similar shaping and bandwidth-limited pulse shaping in the gain medium.) The amplified and positively chirped pulse exits the gain segment of the fiber and enters the NPE section. This section of the cavity serves as an effective saturable absorber. It may also serve as a free-space propagating output port for coupling a portion of the energy of the pulse out of the cavity. The residual part of the pulse remaining in the cavity is compressed in the net anomalous dispersion section, all the while maintaining its substantially parabolic pulse shape. An important aspect of this anomalous dispersion section is that there is negligible nonlinear interaction of the pulse in this portion of the cavity in order to avoid limitations imposed by soliton effects. Lastly, propagation through the isolator and quarter wave plate serve to prevent back reflections as well as support unidirectional operation.

At this point it is instructive to compare the operational characteristics of this self-similar (or "similariton") laser oscillator with those of prior art, namely the soliton and stretched pulse lasers of U.S. Pat. Nos. 4,835,778 and 5,617,434, respectively, in tabular form.

TABLE 4

| Type of laser | Similariton | Stretched-pulse | Soliton |
|---|---|---|---|
| Nonlinear phase $\varnothing^{NL}$ | >>1 | ~1 | <<1 |
| Solution to the wave equation | asymptotic | breathing | static |
| Changes in pulse duration per round trip | One minimum per round trip | Two minima per round trip | Unchanging |
| Variation in chirp per round trip | Normal Always positive | Both positive and negative | No chirp |
| Net dispersion |  | Normal or Anomalous | Anomalous |

Table 4 is a table comparing the invention with prior art soliton and stretched-pulse lasers.

Figure 4:
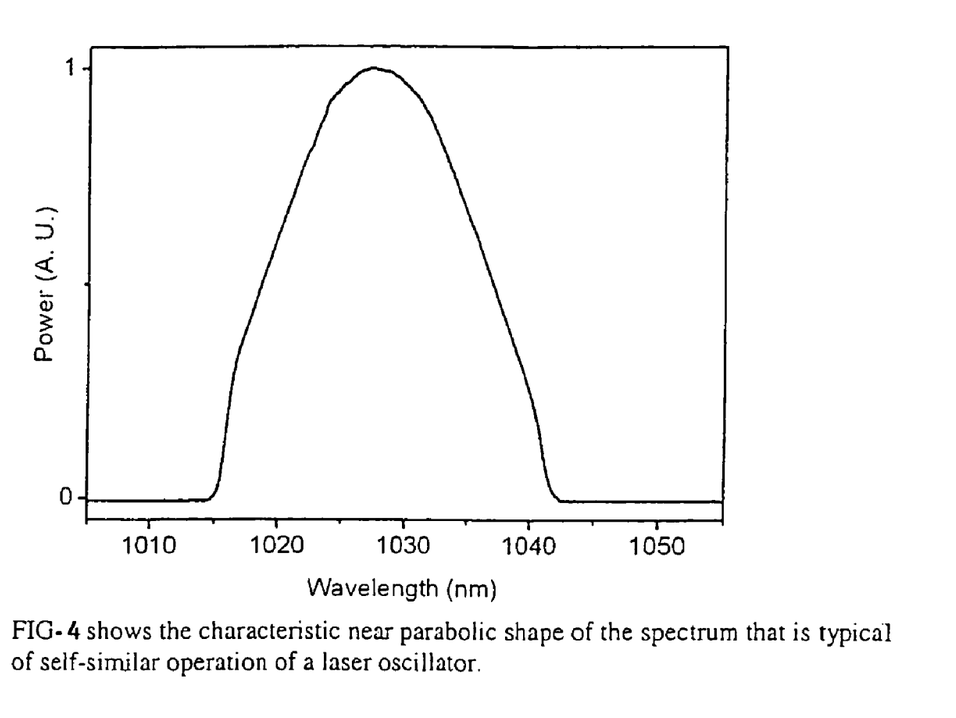
FIG. 4 shows the characteristic near parabolic shape of the spectrum that is typical of self-similar operation of the invention.
Figure 5:
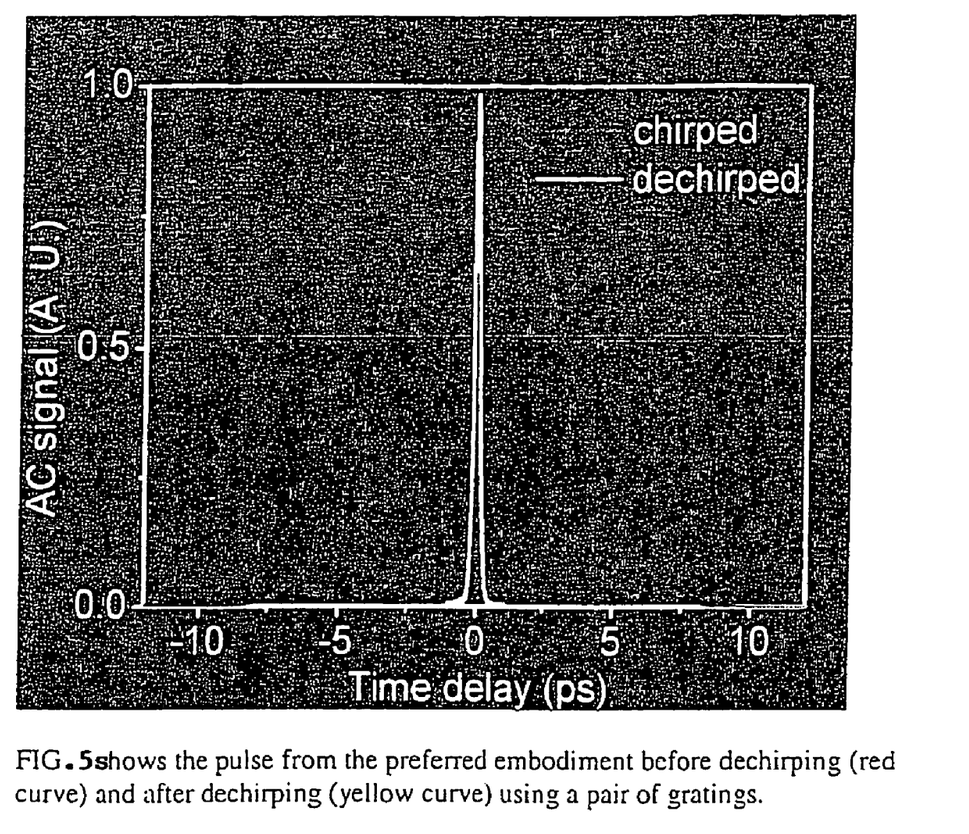
FIG. 5 shows the pulse from the preferred embodiment before dechirping (red curve) and after dechirping (yellow curve) using a pair of gratings.

The preferred embodiment described herein had a total dispersion of 0.005 ps$^2$ and an output pulse energy of about 2 nJ. Its spectrum exhibits the near parabolic spectral shape bounding the center wavelength of operation shown in FIG. 4 that is characteristic of a laser oscillator. In FIG. 5 is seen the pulse width before dechirping (5 ps FWHM) and after dechirping with a pair of gratings (125 fs FWHM).

Figure 6:
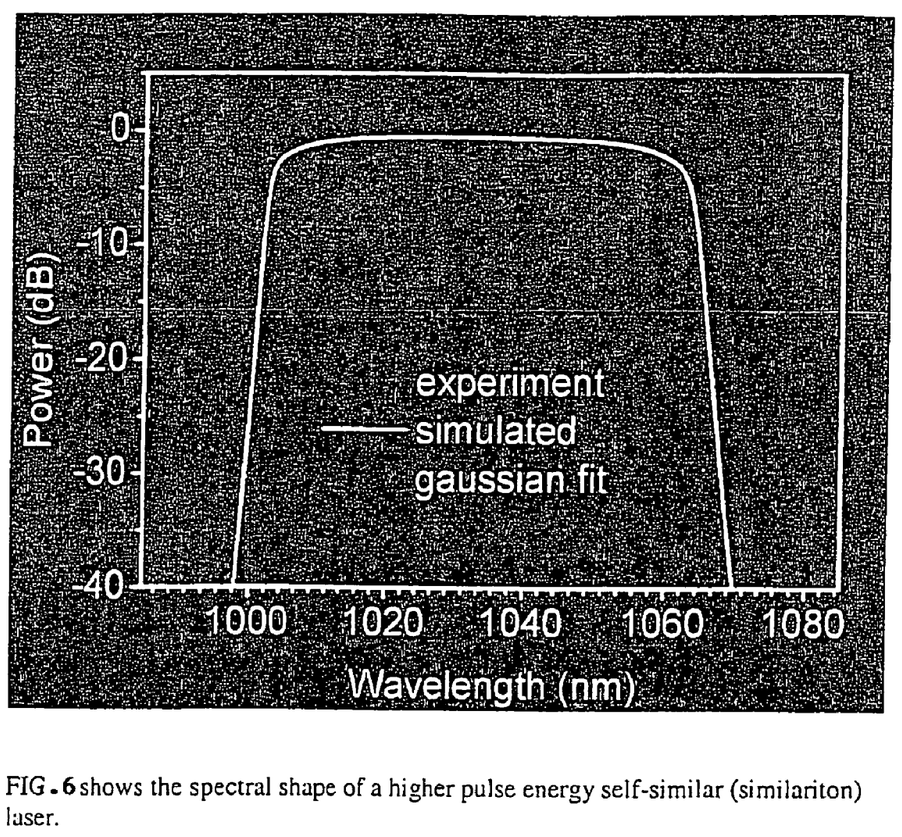
FIG. 6 shows the spectral shape of a version of a self-similar (similariton) laser designed to produce maximum peak power, i.e. highest pulse energy in the shortest possible pulse.

In FIG. 6 is shown the spectral shape of a higher pulse energy version of the self-similar (similariton) laser. This particular construct had a total dispersion of 0.004 ps$^2$, an output pulse energy of 6 nJ, and an output pulse width of 1.5 ps FWHM before dechirping.

Figure 7:
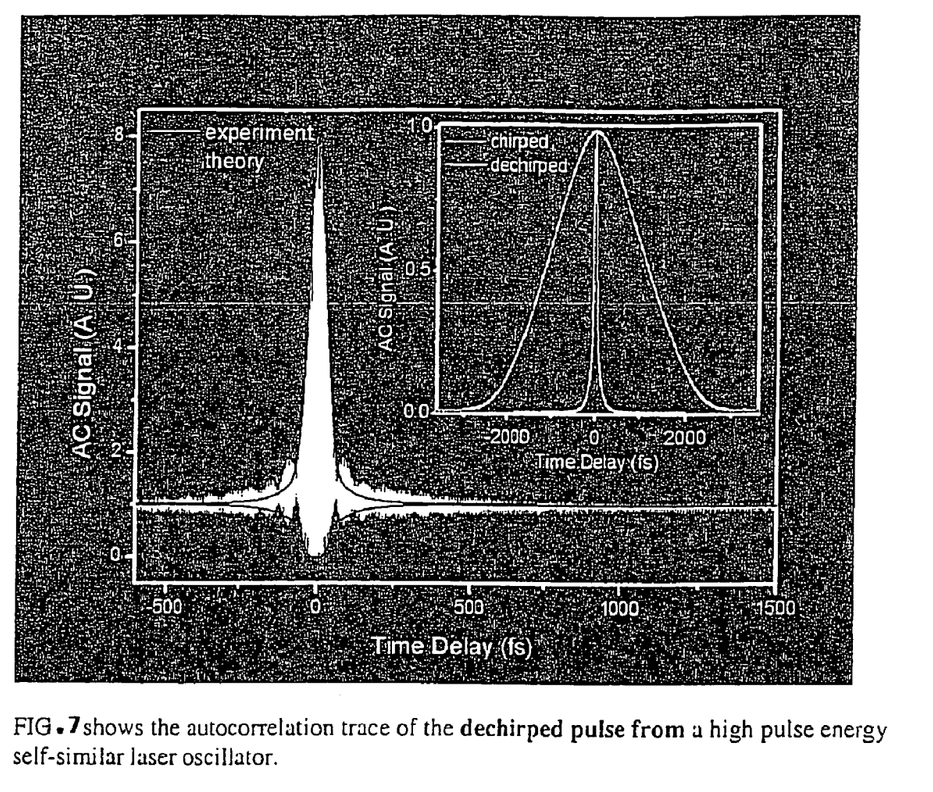
FIG. 7 shows the autocorrelation trace of the dechirped pulse from a high pulse energy self-similar laser oscillator.

FIG. 7 shows an interferometric autocorrelation of the self-similar laser of the subject invention compressed to 50 fs and possessing a pulse energy of 5 nJ. The inset curve shows the background-free autocorrelation before and after compression.

Figure 8:
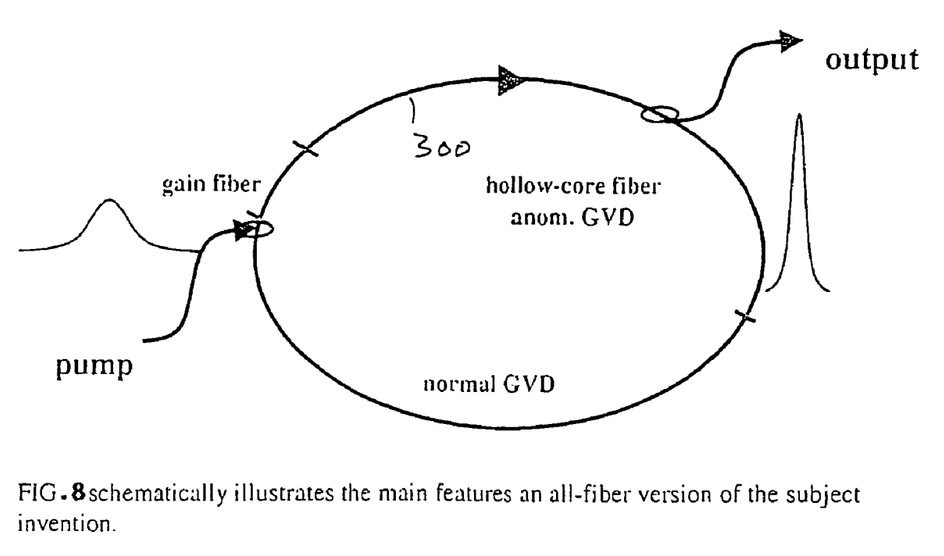
FIG. 8 schematically illustrates the main features an all-fiber version of the subject invention.

FIG. 8 schematically illustrates the main features an all-fiber version of the subject invention in which the linear anomalous dispersion segment provided by the gratings in FIG. 2 is by way of illustration replaced by a hollow microstructure fiber 300 with anomalous dispersion. Those skilled in the art will recognize that this system would also require a means to favor unidirectional operation and an effective saturable absorber to function as a useful laser oscillator. These elements and other aspects of the subject invention will be obvious to those skilled in the art.

The invention has been described in detail with particular reference to certain preferred embodiments thereof. It will be understood that variations, combinations, and modifications can be effected within the spirit and scope of the present invention.

The invention claimed is:

1. A method of operating a mode-locked laser comprising the steps of:

propagating an intracavity laser pulse through a cavity of said laser by propagating said pulse through a first, nonlinear segment having normal group velocity dispersion for imparting a temporal monotonic broadening of said pulse;

propagating the intracavity laser pulse through a second segment that produces gain; and propagating the laser pulse through a third segment having anomalous group velocity dispersion for imparting a temporal monotonic narrowing of said pulse as it propagates around the cavity, said first and third segments being selected such that said cavity has a net normal group velocity dispersion and said propagating of the pulse through said segments produces one maximum value of the pulse width and one minimum value of the pulse width in one round trip of the pulse in the cavity.

2. The method of claim 1, wherein a least said first and third segments are each formed from optical fiber.

3. The method of claim 1, wherein said second segment has a net normal group velocity dispersion and is doped with an element that produces gain.

4. The method of claim 1, wherein the pulse propagating therein is characterized by a center wavelength of operation and a spectral bandwidth having a parabolic shape in the region bounding the center wavelength of operation.

5. The method of claim 1, wherein the propagation of said pulse produces a substantially linear sweep in frequency across the temporal profile of the pulse.

6. The method of claim 1, wherein the phase of the pulse propagating in the cavity is characterized by a positive chirp.

7. The method of claim 1, wherein the pulse propagating within the cavity is characterized by a frequency that varies monotonically.

8. A mode-locked laser for generating pulses of light comprising:

an optical cavity including a non-linear normal dispersion segment for imparting a temporal broadening of said pulses; an anomalous dispersion segment for imparting a temporal narrowing of said pulses; and a gain medium disposed within said cavity for imparting gain to said pulses;

said normal and anomalous dispersion segments being selected such that said cavity has a net normal group velocity dispersion and propagating of the pulse through said segments produces one maximum value of the pulse width and one minimum value of the pulse width in one round trip of the pulse in the cavity; and, a pump source coupled to said gain medium.

9. The laser of claim 8, wherein a least said first and third segments are each formed from optical fiber.

10. The laser of claim 8, wherein said second segment has a net normal group velocity dispersion and is doped with an element that produces gain.

11. The laser of claim 10, wherein said segments are configured such that the pulse propagating therein is characterized by a center wavelength of operation and a spectral bandwidth having a parabolic shape in the region bounding the center wavelength of operation.

12. The laser of claim 8, wherein the segments are configured such that propagation of said pulse produces a substantially linear sweep in frequency across the temporal profile of the pulse.

13. The laser of claim 8, wherein the segments are configured such that the phase of the pulse propagating in the cavity is characterized by a positive chirp.

14. The laser of claim 8, wherein the segments are configured such that the pulse propagating within the cavity is characterized by a frequency that varies monotonically.

* * * * *